(12) United States Patent
Nelson

(10) Patent No.: US 6,530,726 B2
(45) Date of Patent: Mar. 11, 2003

(54) CUTTING INSERT HAVING IMPROVED CUTTING

(75) Inventor: Joseph V. Nelson, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/826,033

(22) Filed: Apr. 4, 2001

(65) Prior Publication Data

US 2002/0146293 A1 Oct. 10, 2002

(51) Int. Cl.$^7$ .............................. B23B 27/22; B23C 5/20
(52) U.S. Cl. ....................... 407/114; 407/116; 407/115; 407/35
(58) Field of Search ................................ 407/114, 115, 407/116, 113, 34, 35, 40, 43, 47, 48, 49, 50, 53, 60, 62

(56) References Cited

U.S. PATENT DOCUMENTS

| | | |
|---|---|---|
| 3,975,809 A | 8/1976 | Sorice et al. ............... 29/95 R |
| 4,575,287 A | 3/1986 | Oshnock et al. ............. 407/41 |
| 5,122,017 A | 6/1992 | Niebauer .................... 407/114 |
| 5,388,932 A | 2/1995 | DeRoche et al. ............ 407/113 |
| 5,672,031 A | 9/1997 | Oles .............................. 407/35 |
| 5,791,833 A | 8/1998 | Niebauer .................... 407/114 |
| 6,050,752 A | 4/2000 | DeRoche .................... 407/114 |

Primary Examiner—Derris H. Banks
Assistant Examiner—Kurt Fernstrom
(74) Attorney, Agent, or Firm—Larry R. Meenan

(57) ABSTRACT

A cutting insert for a metalworking operation includes a polygonal body of hard wear resistant material. The body has a top surface and a bottom surface, and therebetween a peripheral wall including adjacent first and second wall portions. The intersection of the first wall portion and the top surface forms a first cutting edge, and the intersection of the second wall portion and the top surface forms a second cutting edge. The first cutting edge and the second cutting edge meet to form a high point which is adapted to engage a workpiece first during the metalworking operation. In one embodiment, the top surface of the cutting insert has a topography that promotes chip control. The topography includes a plain adjacent to the cutting edges, and a plateau on the plain, which is, located inward from the cutting edges. The plateau is elevated relative to the plain and has a sloped side.

20 Claims, 3 Drawing Sheets

CUTTING INSERT HAVING IMPROVED CUTTING

BACKGROUND OF THE INVENTION

1. Field of the Invention

The present invention relates in general to cutting tools used in metalworking operations. In particular, the invention relates to a cutting insert for a cutting tool, which has improved cutting properties. In one embodiment, the cutting insert also promotes chip control during the metalworking operation.

2. Description of the Related Art

A cutting tool used in a metalworking operation, such as a milling operation, typically includes a cutter body holding a plurality of cutting inserts. During the metalworking operation, the cutting inserts engage the workpiece to remove material therefrom. A cutting insert which requires a relatively large amount of force to remove material from the workpiece increases the power requirements of the cutting tool, and increases the wear of the cutting insert. Therefore, it would be desirable to provide a cutting insert that reduces the amount of force required to remove material from the workpiece.

U.S. Pat. No. 6,050,752 to DeRoche, issued Apr. 18, 2000, discloses a cutting insert in which the corner cutting edges are elevated relative to the side cutting edges. The corner cutting edges have the same height along their entire length. This design requires a relatively large amount of force to remove material from the workpiece.

To maximize efficiency and minimize the potential for damage caused by the material removed during the metalworking operation, cutting inserts are designed to remove this material and thereafter to reduce it into short segments known as chips. The design of cutting inserts to promote and control the formation of chips is referred to as chip control. There is a need for cutting inserts having improved chip control features.

U.S. Pat. No. 5,122,017 to Niebauer, issued Jun. 16, 1992, discloses a cutting insert having different geometries at different locations on the top surface. This design is intended to allow the cutting insert to have a desirable cutting surface in contact with the workpiece under differing parameters, not to improve chip control.

SUMMARY OF THE INVENTION

The invention relates a cutting insert for use in a cutting tool for a metalworking operation. The cutting insert comprises a polygonal body of hard wear resistant material. The body has a top surface and a bottom surface, and therebetween a peripheral wall including adjacent first and second wall portions. The intersection of the first wall portion and the top surface forms a first cutting edge, and the intersection of the second wall portion and the top surface forms a second cutting edge. The first cutting edge and the second cutting edge meet to form a high point which is adapted to engage a workpiece first during the metalworking operation.

In one embodiment of the invention, the cutting insert is indexable. The peripheral wall of the body includes side wall portions and corner wall portions. The intersections of the side wall portions and the top surface form side cutting edges, and the intersections of the corner wall portions and the top surface form corner cutting edges. The side cutting edges and the corner cutting edges meet to form high points. Each of the high points is adapted to engage a workpiece first during a metalworking operation.

The cutting insert of the invention reduces the amount of force required to remove material from the workpiece, thereby reducing the power requirements and associated cost of the metalworking operation. By reducing the cutting forces, wear and breakage of the cutting insert will be minimized and the life of the cutting insert will accordingly be improved.

In another embodiment of the invention, the top surface of the cutting insert has a topography that promotes chip control. The topography includes a plain adjacent to the cutting edges, and a plateau on the plain, which is, located inward from the cutting edges. The plateau is elevated relative to the plain and has a sloped side.

BRIEF DESCRIPTION OF THE DRAWINGS

While a preferred embodiment of the cutting insert of the invention is illustrated, the particular embodiment shown should not be construed to limit the claims. It is anticipated that various changes and modifications may be made without departing from the scope of this invention.

DESCRIPTION OF THE PREFERRED EMBODIMENTS

Figure 1:
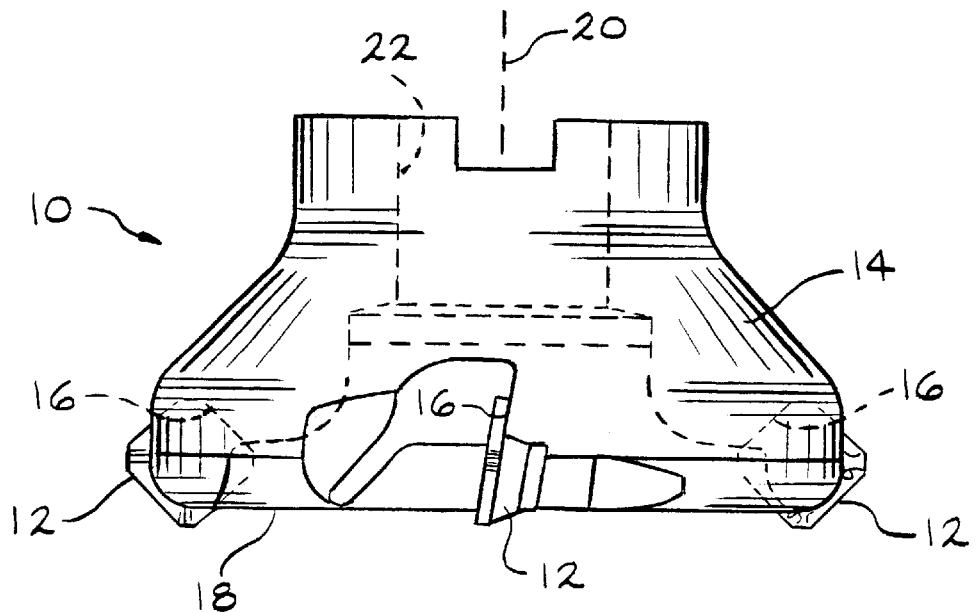
FIG. 1 is a side elevational view, partially cut away, of a milling cutter holding a plurality of cutting inserts according to the invention.

Referring now to the drawings, FIG. 1 shows a milling cutter 10 holding a plurality of cutting inserts 12 according to the invention. The milling cutter 10 comprises a cutter body 14 having a plurality of circumferentially spaced insert pockets 16 disposed about its cutting end 18. A cutting insert 12 is secured within each of the insert pockets 16. For purposes of simplification, only three insert pockets 16 and cutting inserts 12 are shown in FIG. 1, although a typical milling cutter includes about 8–15 cutting inserts. The cutting inserts 12 project downwardly and radially outwardly from the cutter body 14.

The cutter body 14 is rotatable about an axis 20 in a counterclockwise direction, as viewed from its cutting end 18. The cutter body 14 has a central bore 22 for attachment to a drive means (not shown) which powers its rotation. In operation, the cutter body 14 rotates, and the milling cutter 10 is advanced into engagement with a workpiece 24 (shown in FIG. 2). Each cutting insert 12 engages the workpiece 24 to remove material from the workpiece 24. The milling cutter 10 is advanced in a sideways direction, e.g., in the direction of arrow 26 in FIG. 2, during the milling operation. Common types of milling operations include face milling, end milling and slotting.

Figure 3:
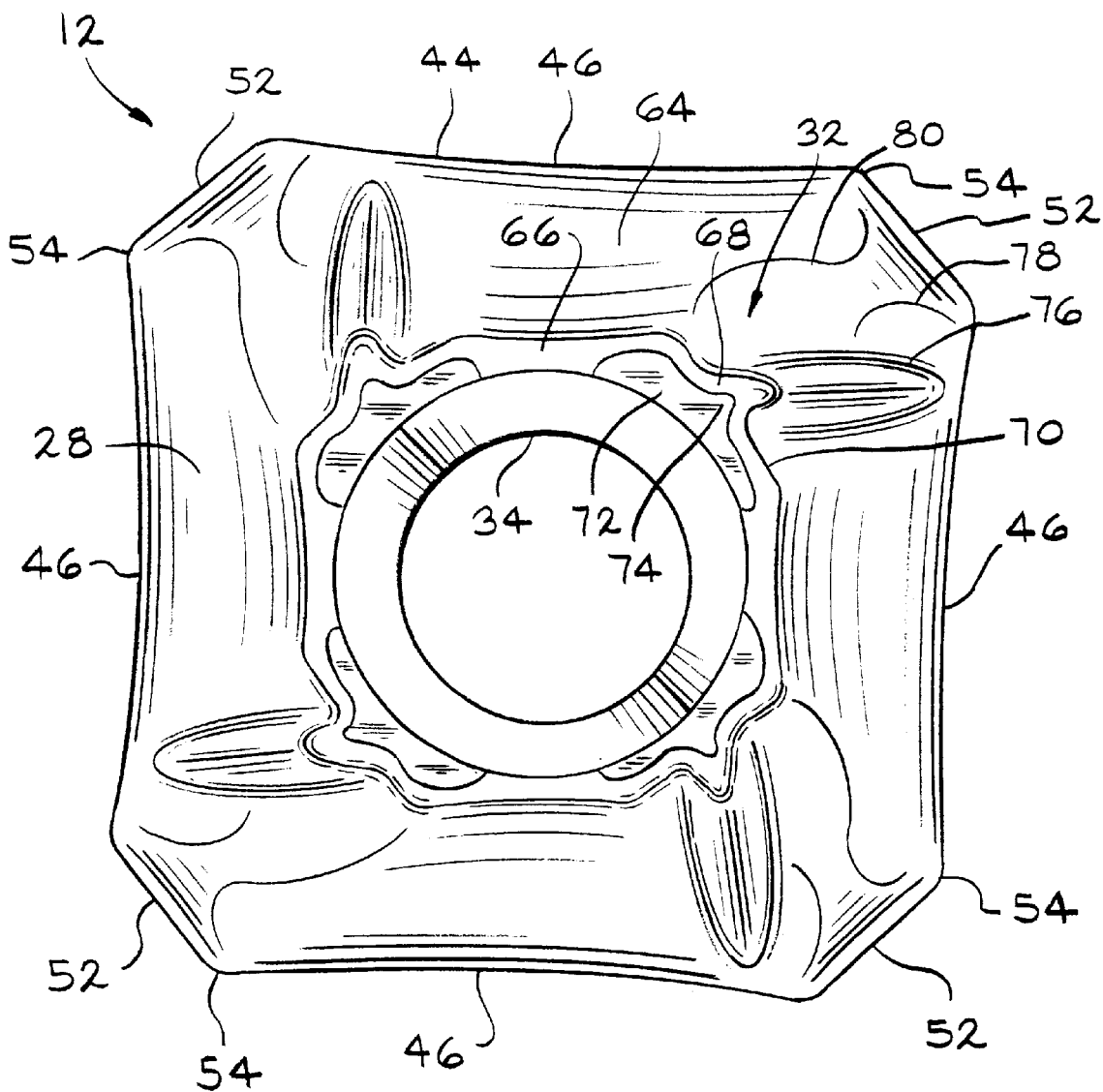
FIG. 3 is an enlarged top view of the cutting insert of the invention.
Figure 4:
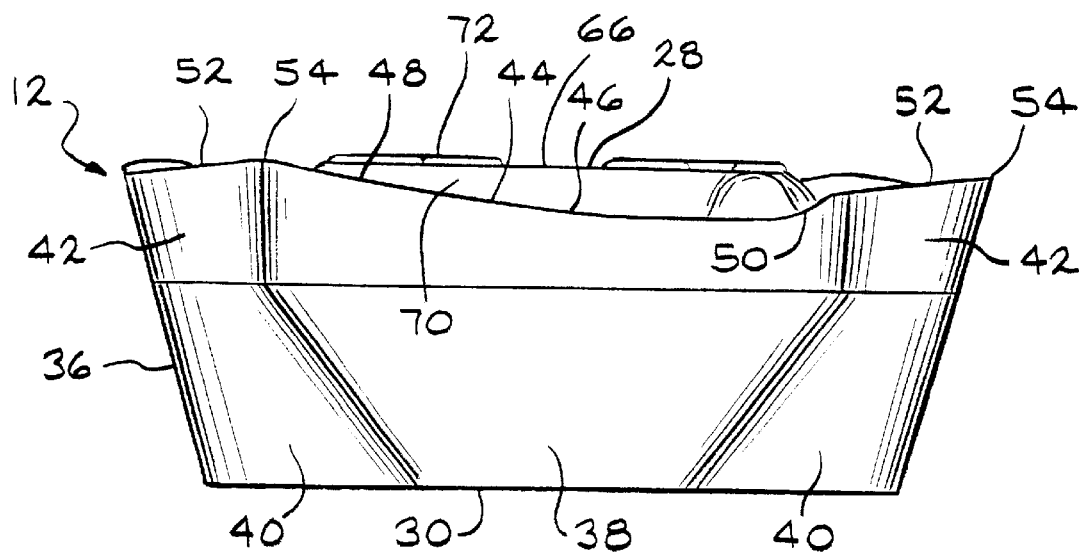
FIG. 4 is an enlarged side view of the cutting insert.

The cutting insert 12 of the invention is shown in more detail in FIGS. 3 and 4. The cutting insert 12 comprises a polygonal body of hard wear resistant material. Any suitable hard and wear resistant material can be used for making the cutting insert 12, such as various carbide materials or ceramic materials. Kennametal Inc., Latrobe, Pa., produces various specialty carbides that are suited for making the cutting insert.

The cutting insert 12 has a top surface 28 and a bottom surface 30. In the illustrated embodiment, the top surface 28 is generally square in shape with beveled corners, and the cutting insert 12 transitions to a circular bottom surface 30. However, the top surface 28 and the bottom surface 30 can also have other shapes. It is envisioned that a series of different cutting inserts (not shown) could be made having top surfaces with different shapes (e.g., square, octagonal, round) and bottom surfaces with the same shape (e.g., round), so that the different inserts would be interchangeable in a particular cutting tool. The illustrated cutting insert 12tis about ½ inch across (from side to side), but other sizes of cutting inserts can also be made.

In the embodiment shown in FIGS. 3 and 4, the top surface 28 of the cutting insert 12 has a topography 32 that promotes chip control. The topography 32 of the cutting insert 12 will be described in detail below.

A circular, central opening 34 extends from the top surface 28 to the bottom surface 30 of the cutting insert 12 to permit securing the cutting insert 12 to the milling cutter 10 with a fastener. Alternatively, the cutting insert 12 could be clamped to the milling cutter 10, in which case the cutting insert 12 would not require a central opening 34.

The cutting insert 12 also has a peripheral wall 36 (shown in FIG. 4) that extends between the top surface 28 and the bottom surface 30. In the illustrated embodiment, the peripheral wall 36 includes four side wall portions 38 (one of which is shown), and four corner wall portions 40 (two of which are shown) which are between and adjacent to the side wall portions 38. However, the peripheral wall 36 could also include more or fewer wall portions, and could have a different shape from the shape shown.

Preferably, the upper portion of each of the corner wall portions 40 is shaped as a facet 42. The facet 42 functions as a wiper during the metalworking operation, providing a more finished cut.

The intersection of the peripheral wall 36 and the top surface 28 forms a cutting edge 44 extending around the periphery of the cutting insert 12. Specifically, the intersections of the side wall portions 38 and the top surface 28 form side cutting edges 46. The side cutting edges 46 include a leading edge portion 48 and a trailing edge portion 50. The intersections of the corner wall portions 40 and the top surface 28 form corner cutting edges 52. As viewed from the top of the cutting insert (FIG. 3), the side cutting edges 46 of the illustrated embodiment form the four sides of a square, while the corner cutting edges 52 form the four beveled corners of the square. However, the cutting edges could also form other shapes. In the illustrated embodiment, the intersections between the side cutting edges 46 and the corner cutting edges 52 are slightly rounded when viewed from the top.

Figure 5:
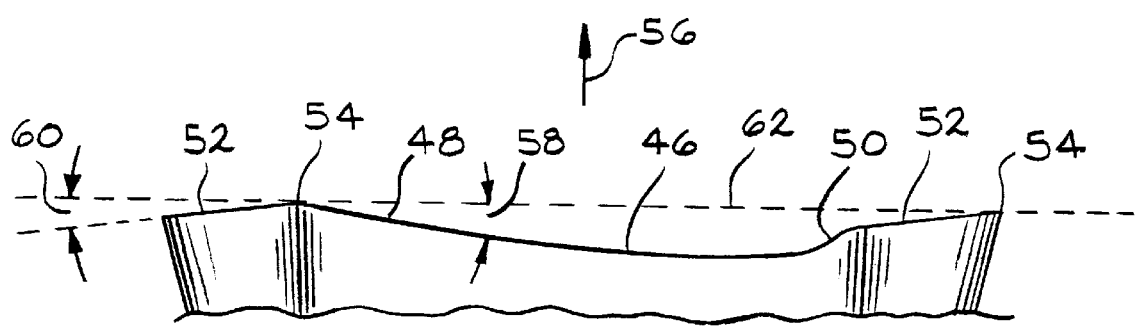
FIG. 5 is an enlarged side view of a portion of the cutting insert, showing the shape of the cutting edge of the insert.

As shown in FIG. 5 along with FIGS. 3 and 4, the side cutting edges 52 and the corner cutting edges 48 meet to form high points 54. By "high points" is meant the points on the cutting edge 44 that extend the greatest distance in the axial direction, as indicated by the arrow 56 in FIG. 5. The illustrated cutting insert 12 has four high points 54 located at the four corners of the cutting insert 12. However, a cutting insert according to the invention can have more or fewer high points depending on the design of the cutting insert. The purpose of the high points 54 will be described below.

As shown in FIG. 5, the leading edge portion 48 of the side cutting edge 46, and the corner cutting edge 52, extend down from the high point 54 at respective first and second angles 58 and 60. The angles 58 and 60 are measured relative to a reference plane 62 that rests upon the four high points 54 at the corners of the cutting insert 12. Preferably, the first and second angles 58 and 60 are between about 0.5° and about 30°, and more preferably between about 2° and about 10°.

Figure 2:
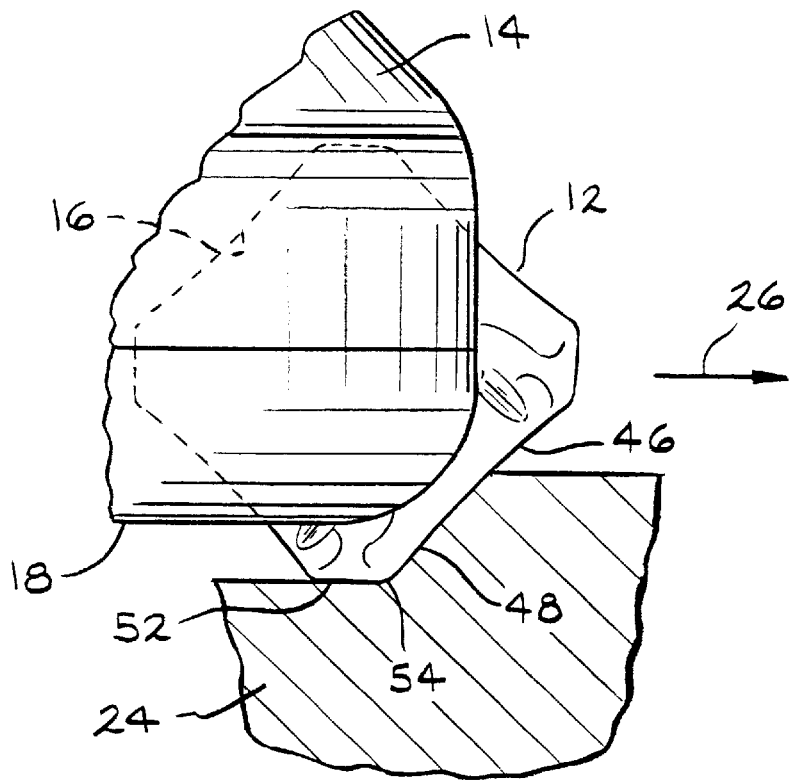
FIG. 2 is an enlarged view of a portion of the milling cutter of FIG. 1, showing a cutting insert engaging a workpiece to remove material therefrom.

The above-described shape of the cutting edge 44 of the cutting insert 12 reduces the amount of force required to remove material from a workpiece during a metalworking operation. As shown in FIG. 2, the cutting insert 12 removes material from the workpiece 24 by engaging the workpiece 24 with a corner cutting edge 52 and a leading edge portion 48 of a side cutting edge 46. A high point 54 of the cutting edge 44 is located at the intersection of the corner cutting edge 52 and the side cutting edge 46. Because the high point 54 is located axially forward the greatest distance, and the corner cutting edge 52 and the leading edge portion 48 of the side cutting edge 46 extend down from the high point 54, the high point 54 engages the workpiece 24 first during the metalworking operation., The cut starts at the high point 54 and proceeds down the adjacent corner cutting edge 52 and the leading edge portion 48 of the side cutting edge 46.

This design of the cutting edge 44 reduces the amount of force required to cut the workpiece 24. While not intending to be limited by theory, it is believed that the cutting force is reduced because the initial force of the cut is at a single point (the high point 54), and the corner cutting edge 52 and the leading edge portion 48 of the side cutting edge 46 gradually ease into the workpiece 24 to complete the cut. The entire corner cutting edge 52 does not cut the workpiece 24 at once, which would require more cutting force.

Referring again to FIGS. 3 and 4, one embodiment of the cutting insert 12 has a topography 32 on the top surface 28 that promotes chip control. The topography 32 is especially adapted to work with the design of the illustrated cutting insert 12, although it could also be used with other designs. The topography 32 includes a plain 64, which is a generally planar surface making up the major portion of the top surface 28. The plain 64 extends inwardly from the cutting edge 44 toward the center of the insert 12. In the illustrated embodiment, the plain 64 is relatively flat a short distance from each of the corner cutting edges 52. Then the plain 64 slopes downward slightly and flattens out as it approaches the center of the cutting insert 12. The illustrated plain 64 slopes downward slightly from the side cutting edges 46 and upward slightly as it approaches the center of the cutting insert 12.

The topography 32 also includes a central plateau 66 surrounding the central opening 34 of the cutting insert 12. The plateau 66 is elevated relative to the plain 64, and it is generally flat. In the illustrated embodiment, the plateau 66 is generally square in shape. The plateau 66 includes radially outwardly protruding portions 68 in the four corners of the plateau. The plateau 66 has sloping sides 70 ascending from the plain 64 to the top of the plateau. While not intending to be limited by theory, it is believed that when the material removed during the metalworking operation hits the sloped side 70 of the plateau 66, the material is caused to break off into a small chip.

The illustrated topography 32 further includes islands 72 on each of the four corners of the plateau 66. The islands 72 are elevated relative to the plateau 66, and include sloping sides and a generally flat top surface. The illustrated islands 72 are generally arcuate and irregular in shape, and include a protruding portion 74 which extends radially outwardly into the protruding portion 68 of the plateau 66. The islands 72 may promote chip control.

The illustrated topography 32 also includes a plurality of ridges 76, 78 and 80 on the plain 64. The ridges are elevated relative to the plain 64. A group of ridges 76, 78 and 80 is located in each of the four corners of the top surface 28. One of the ridges 76 is generally elliptical in shape. The elliptical ridge 76 extends inwardly from the side cutting edge 46 to the protruding portion 68 of the plateau 66. Another of the ridges 78 is arcuate in shape, and extends from the intersection of the side cutting edge 46 and the corner cutting edge 52 to a side of the elliptical ridge 76. Another of the ridges 80 is curved in shape, having the general shape of an inverted S-curve. The curved ridge 80 is spaced a short distance from the other ridges 76 and 78, and extends between the high point 54 of the cutting edge 44 and the plateau 66. The ridges 76, 78 and 80 may also promote chip control.

Having described specific embodiments, the invention may be otherwise embodied within the scope of the appended claims. For example, it is contemplated that the cutting insert of the invention could be used in other metalworking operations besides milling. The cutting insert could be shaped differently from the embodiment illustrated. While the illustrated cutting insert is indexable, a cutting insert could also be made that was not indexable (e.g., because it had a single high point instead of a high point in each corner of the insert). The topography of the top surface could be modified from that in the illustrated embodiment.

What is claimed is:

1. A cutting insert for a metalworking operation, comprising a polygonal body of hard wear resistant material having a top surface and a bottom surface, and a peripheral wall extending between the top surface and the bottom surface, the peripheral wall including adjacent first and second wall portions, the intersection of the first wall portion and the top surface forming a first cutting edge and the intersection of the second wall portion and the top surface forming a second cutting edge, the first cutting edge and the second cutting edge meeting to form a point wherein said point comprises a high point such that the high point engages a workpiece first during the metalworking operation.

2. A cutting insert according to claim 1 wherein the first cutting edge and the second cutting edge extend down from the high point at respective first and second angles, and wherein the first and second angles are between about 0.5° and about 30°.

3. A cutting insert according to claim 2 wherein the first and second angles are between about 2° and about 10°.

4. A cutting insert according to claim 1 wherein the first wall portion is a side wall portion which forms a side cutting edge, and the second wall portion is a corner wall portion which forms a corner cutting edge.

5. A cutting insert according to claim 4 wherein the upper portion of the corner wall portion comprises a facet.

6. A cutting insert according to claim 4 wherein the side cutting edge includes a leading edge portion which extends down from the high point and a trailing edge portion which extends up from the leading edge portion.

7. A cutting insert according to claim 1 wherein an intersection between the first cutting edge and the second cutting edge is rounded when viewed from the top of the cutting insert.

8. An indexable cutting insert for a metalworking operation, comprising a polygonal body of hard wear resistant material having a top surface and a bottom surface, and a peripheral wall extending between the top surface and the bottom surface, the peripheral wall including side wall portions and corner wall portions, the intersections of the side wall portions and the top surface forming side cutting edges and the intersections of the corner wall portions and the top surface forming corner cutting edges, the side cutting edges and the corner cutting edges meeting to form a point, wherein said point comprises a high point such that each of the high points engage a workpiece first during the metalworking operation.

9. A cutting insert according to claim 8 wherein the side cutting edges and the corner cutting edges extend down from the high points at respective first and second angles, and wherein the first and second angles are between about 0.5° and about 30°.

10. A cutting insert according to claim 9 wherein the first and second angles are between about 2° and about 10°.

11. A cutting insert according to claim 8 wherein the upper portion of each of the corner wall portions comprises a facet.

12. A cutting insert according to claim 8 wherein each of the side cutting edges includes a leading edge portion which extends down from the high point and a trailing edge portion which extends up from the leading edge portion to an adjacent corner cutting edge.

13. A cutting insert for a metalworking operation, comprising a polygonal body of hard wear resistant material having a top surface and a bottom surface, and a peripheral wall extending between the top surface and the bottom surface, the peripheral wall including adjacent first and second wall portions, the intersection of the first wall portion and the top surface forming a first cutting edge and the intersection of the second wall portion and the top surface forming a second cutting edge, the first cutting edge and the second cutting edge meeting to form a point, wherein said point comprises a high point such that the high point engages a workpiece first during the metalworking operation, and the top surface having a topography that promotes chip control, the topography comprising a plain adjacent to the cutting edges and a plateau on the plain which is located inward from the cutting edges, the plateau being elevated relative to the plain and having a sloped side.

14. A cutting insert according to claim 13 wherein the topography further comprises an island on the plateau which is elevated relative to the plateau.

15. A cutting insert according to claim 13 wherein the plain slopes downward from cutting edges.

16. A cutting insert according to claim 13 wherein the plateau has a radially outwardly protruding portion.

17. A cutting insert according to claim 13 wherein the topography further comprises a ridge on the plain.

18. A cutting insert according to claim 17 wherein the ridge is a curved ridge.

19. A cutting insert according to claim 17 wherein the ridge is a generally elliptical ridge.

20. A cutting insert according to claim 13 wherein the cutting insert is an indexable cutting insert having a plurality of cutting portions, and wherein the topography is located on the top surface in each of the cutting portions.

* * * * *